United States Patent [19]
Reynard et al.

[11] 3,852,581
[45] Dec. 3, 1974

[54] TWO BIT BINARY DIVIDER

[75] Inventors: Fred T. Reynard, King of Prussia; Donald E. Feldpush, Drexel Hill; Joseph S. Schibinger, King of Prussia, all of Pa.

[73] Assignee: Burroughs Corporation, Detroit, Mich.

[22] Filed: Dec. 14, 1972

[21] Appl. No.: 314,979

[52] U.S. Cl. .................... 235/164
[51] Int. Cl. .................... G06f 7/52
[58] Field of Search .................... 235/164

[56] References Cited

UNITED STATES PATENTS

| | | | |
|---|---|---|---|
| 3,223,831 | 12/1965 | Holleran | 235/164 |
| 3,564,226 | 2/1971 | Seligman | 235/164 |
| 3,621,218 | 11/1971 | Nishimoto | 235/164 |
| 3,733,477 | 5/1973 | Tate | 235/164 |

OTHER PUBLICATIONS

K.G. Tan, "Uniform 2 Bits Quotients Binary Division by Carry-Save Adders," IBM Tech. Discl. Bulletin, Vol. 14, No. 11, April 1972, pp. 3279–3281.

*Primary Examiner*—Malcolm A. Morrison
*Assistant Examiner*—David H. Malzahn
*Attorney, Agent, or Firm*—Edward J. Feeney, Jr.; Edward G. Fiorito

[57] ABSTRACT

Method and apparatus for performing 2-bit, non-restore, look-ahead, binary division for a digital processor wherein 2 quotient bits are generated simultaneously during one adder cycle; the cycle length needed to develop these 2 bits being essentially limited to the time needed by the adder to perform subtraction. A multiple of the divisor to be subtracted from four times the remainder (4R −MD) for the succeeding cycle is selected concurrently with the remainder developed as a result of the subtraction. A table and decoder are preferably used to examine the magnitudes of the remainder and the divisor to predict this multiplication factor which may also be developed tentatively into the 2-bit quotient. A correction may then be made to the tentative quotient as a result of the adder operation, the corrected quotient being entered into the quotient register.

6 Claims, 9 Drawing Figures

Correct Quotient Determination

| | | | | |
|---|---|---|---|---|
| $R_{p-1}$ | + | | - | |
| $R_p$ | + | - | + | - |
| Q → QReq | $Q_T$ | $Q_T-1$ | $4-Q_T$ | $3-Q_T$ |

FIG. 3

Correct Multiplication Factor Determination

| | | | | |
|---|---|---|---|---|
| $R_{p-1}$ | + | | - | |
| $R_p$ | + | - | + | - |
| M | $q_2$ | $4-q_2$ | $4-q_2$ | $-q_2$ |

FIG. 4

FIG. 6

| Normalized D | Multiples |
|---|---|
| 1X | 0011100....0 |
| $\overline{1X}$ | 1100011....1 |
| 2X | 0111000....0 |
| $\overline{2X}$ | 1000111....1 |
| 3X | 1010100....0 |
| $\overline{3X}$ | 0101011....1 |

$\frac{3115}{7} = 445: \frac{110000101011}{000000000111} = 000110111101$ $r_1 \ldots r_6$

| | |
|---|---|
| 00110000101011 | Original Dividend |
| 000110000101011 | Shifted Right 1 (Lgth. Diff. Odd) |
| 01100001010110 | 4 x 5 Shifted Dividend |

| Adder Cycle No. | Decoder Output | Selection | Sign | | Quotient |
|---|---|---|---|---|---|
| 1 | CD12 | $\frac{.01..}{.11..}$ = 2X→ | +<br>-<br>- | 01100001010110<br>10001111111111<br>11110001010101 | $Q_1$ - 1<br>000000000010<br>000000000001 |
| 2 | CD01 | 1X→ | -<br>+<br>- | 11000101010111<br>00111000000000<br>11111101010111 | 3 - $Q_1$<br>000000000101<br>000000000110 |
| 3 | D01 | 1X→ | -<br>+ | 11110101011111<br>00111000000000<br>00101101011111<br>1<br>00101101100000 | 4 - $Q_1$<br>000000011001<br>000000011011 |

FIG. 6a

| Adder Cycle No. | Decoder Output | Selection | Sign | | Quotient |
|---|---|---|---|---|---|
| 4 | CD23 | 3X → | +<br>-<br><br><br>+ | 10110110000000<br>01010111111111<br>00001101111111<br>1<br>00001110000000 | $Q_1$<br>000001101111 |
| 5 | CD01 | 1X → | +<br>- | 00111000000000<br>11000111111111<br>11111111111111 | $Q_1$ - 1<br>000110111101<br>000110111100<br><br>Quot. Corr. 1<br>000110111101 |

*Dection of a zero remainder (all one's) requires a Quotient Correction of +1.

FIG. 7

| Normalized D Multiples | |
|---|---|
| 1X | 0011010....0 |
| $\overline{1X}$ , | 1100101....1 |
| 2X | 0110100....0 |
| $\overline{2X}$ | 1001011....1 |
| 3X | 1001110....0 |
| $\overline{3X}$ | 0110001....1 |

$$\frac{(2925)}{13} = (225) : \frac{101101101101}{000000001101} = 000011100001$$

$r_1 \ldots r_6$

| | |
|---|---|
| 00101101101 | Original Dividend |
| 0000101101101 | Dividend Shifted Right 2 (Lgth. Diff. = Even) |
| 00101101101101 | 4 x Shifted Dividend |

| Adder Cycle No. | Decoder Output | Selection | Sign | | Quotient |
|---|---|---|---|---|---|
| 1 | CD01 | 1X→ | +<br>-<br>- | 00101101101101<br>11001011111111<br>11111001101100 | $Q_1$ -1<br>000000000001<br>000000000000 |
| 2 | D02 | 1X→ | -<br>+<br>+ | 11100110110011<br>00110100000000<br>00011010110011<br>1<br>00011010110100 | 4 - $Q_1$<br>000000000001<br>000000000011 |
| 3 | CD12 | 2X→ | +<br>-<br><br><br>+ | 01101011010000<br>10010111111111<br>00000011001111<br>1<br>00000011010000 | $Q_1$<br>000000001110 |

FIG. 7a

| Adder Cycle No. | Decoder Output | Selection | Sign | | |
|---|---|---|---|---|---|
| | | | + | 00001101000000 | $Q_1$ - 1 |
| 4 | D01 | 1X→ | - | 11001011111111 | 000000111001 |
| | | | - | 11011000111111 | 000000111000 |
| | | | - | 01100011111111 | 3 - $Q_1$ |
| 5 | CD23 | 3X→ | + | 10011100000000 | 000011100011 |
| | | | - | 11111111111111 | 000011100000 |
| | | | | | Quot. Corr. 1<br>000011100001 |

*Detection of a zero remainder (all one's) requires a quotient correction of +1.

TWO BIT BINARY DIVIDER

BACKGROUND OF THE INVENTION

Division as performed by machine requires an examination of the divisor with relation to the dividend or partial remainder. Usually as many digits of the quotient as possible are determined and then an additional digit is guessed at. Arithmetic such as subtraction is then performed on the dividend or partial remainder to verify this guess. This divisional process has always been a very time consuming one requiring a number of machine cycles to perform each operation.

Various techniques have been employed for increasing the speed of division. Some of these are early termination of arithmetic, non-restoration of remainder, guessing as to several bits of the quotient at one time, and normalizing the remainder and divisor.

Non-restoring division has in the past consisted of performing subtraction arithmetic, entering the quotient bit, and then single shifting the remainder and quotient. A "1" or "0" was entered in the quotient register depending upon whether the sign of the remainder changed or not.

Quotient look-ahead principles have sought to develop two or more quotient bits at one time. This is done by comparing a limited number of corresponding bits of the partial remainder and the divisor. A method of comparison has been used wherein 2 corresponding and adjacent bits of the divisor and dividend are compared to yield 2 quotient bits which can be one of four possibilities, 00, 01, 10, 11. The subtraction which has been performed can be $(R - ½MD) = R'$ where M is either 0, 1, 2 or 3. Thus the capability of subtracting one, two or three halves of the divisor has been developed in 2-bit, look-ahead, 1-bit comparison. In this method a sign comparison is made between divisor and partial remainder to determine the multiple of the divisor to be subtracted. As Ivan Flores, The Logic of Computer Arithmetic [Prentice Hall, Englewood, N. J.] 1963 page 261 has stated, an uncertainty arrises with this method as to what the exact optimal multiplier is in each instance. It is to be expected, that on the average, in only half of the time a successful development of the two quotient bits is made by the above method; the rest of the time two cycles are required to develop 2 bits of quotient.

Previously, 2-bit, look-ahead, 4-bit compare methods have been developed. But these methods require that the five most significant bits of the divisor and the remainder be available for comparison. The right most four of each are actually compared. However, with this method a great deal of examination must take place and the probability of error, according to Flores [supra]page 264, is 3/32. The difficulty with these look-ahead systems is their propensity for error which required two machine cycles to develop the correct quotient bits.

Prior art non-restoring techniques have overcome some of these difficulties. Non-restoring techniques compensate for wrong guesses. A decoder provides either the correct divisor multiple or one just larger. When the wrong multiple is discovered, the sign of the remainder is changed. In doing this however, the final remainder sign is wrong even though a proper remainder value is obtained. The correction of the sign requires another machine cycle. In addition, prior art non-restore, look-ahead, dividers teach normalization of both the divisor and the remainder. A method as taught by Flores [supra]page 272uses a decoder to examine 2 corresponding bits of the divisor and the remainder to determine a multiple of one half the divisor to be subtracted from the remainder $(R - M/2D)$. A second operation examines the divisor half multiple which was used, the old remainder sign, and the new remainder sign to determine the 2 quotient bits. However, this process of necessity has to be a serial one which can be completed in a single timing cycle of long period with respect to the period of adder operation. In high frequency circuits where periods are short this method could not be carried out in one cycle time.

It is therefore an object of this invention to provide a divisional method wherein 2 quotient bits are developed in a single cycle.

Another object of this invention is to provide a non-restore, look-ahead, 2-bit divisional method wherein the parameters needed for the arithmetic operation of each succeeding cycle are developed in parallel with the aithmetic operation of a present cycle.

A further object of this invention is to reduce the time to develop each 2 bits of quotient to a period approaching the operational time of the adder.

Another object of this invention is to provide an apparatus capable of performing this divisional method.

SUMMARY OF THE INVENTION

The objectives of this invention are accomplished by a non-restore, look-ahead, binary division method and apparatus which generates 2 quotient bits in essentially each adder cycle and wherein the guessing of quotient bits and a divisor multiplication factor may be accomplished in parallel with the subtraction process in which the multiplication factor may be used to generate a new remainder.

Table comparison, mechanized by a decoder, of the six most significant bits of the current remainder and the five most significant bits of the divisor to yield a tentative multiplication factor to be used in the subtraction of a multiple of the divisor from four times the remainder, $(4R - MD)$, in cycle $P$ is preferably initiated simultaneously with the "$p$—1" cycle subtraction as performed by the adder.

This tentative multiplication factor may be adjusted as a function of the sign change between the current and its preceeding remainder to yield the actual multiple of the divisor to be in the next subtraction.

This corrected multiple may also be designated as the tentative 2 quotient bits to be entered into the quotient register in the next cycle. The tentative quotient is preferably corrected to the proper value and entered into the quotient register as a function of the sign change between the newly developed and its proceeding remainder in the next cycle period.

DESCRIPTION OF THE DRAWINGS

The various objectives, advantages and features of this invention will become more fully apparent from the following detailed description taken in conjunction with the following drawings in which like characters refer to like parts and in which:

FIG. 3 shows the corrections made to the temporary quotient bits before they are entered into the quotient register as a function of the sign change between successive remainders.

FIG. 4 shows the corrections made to the divisor multiplication factor before this factor multiplies the divisor.

DETAILED DESCRIPTION OF THE INVENTION

The present invention relates to apparatus and to a method of division in a computing system for generating 2 bits of quotient per cycle of divider operation wherein this cycle of operation in which 2 quotient bits are generated is not substantially longer than the time period of operation of the adder. To this end, this invention is preferably embodied in the division mechanism of a data processor. Typically 2-bit, look-ahead, non-restore techniques are used which in their implementation utilize quotient, divisor, and partial remainder registers, an adder in which a function of the divisor is subtracted from a function of the remainder, and a predicting table for predicting succeeding quotient bits.

Figure 1:
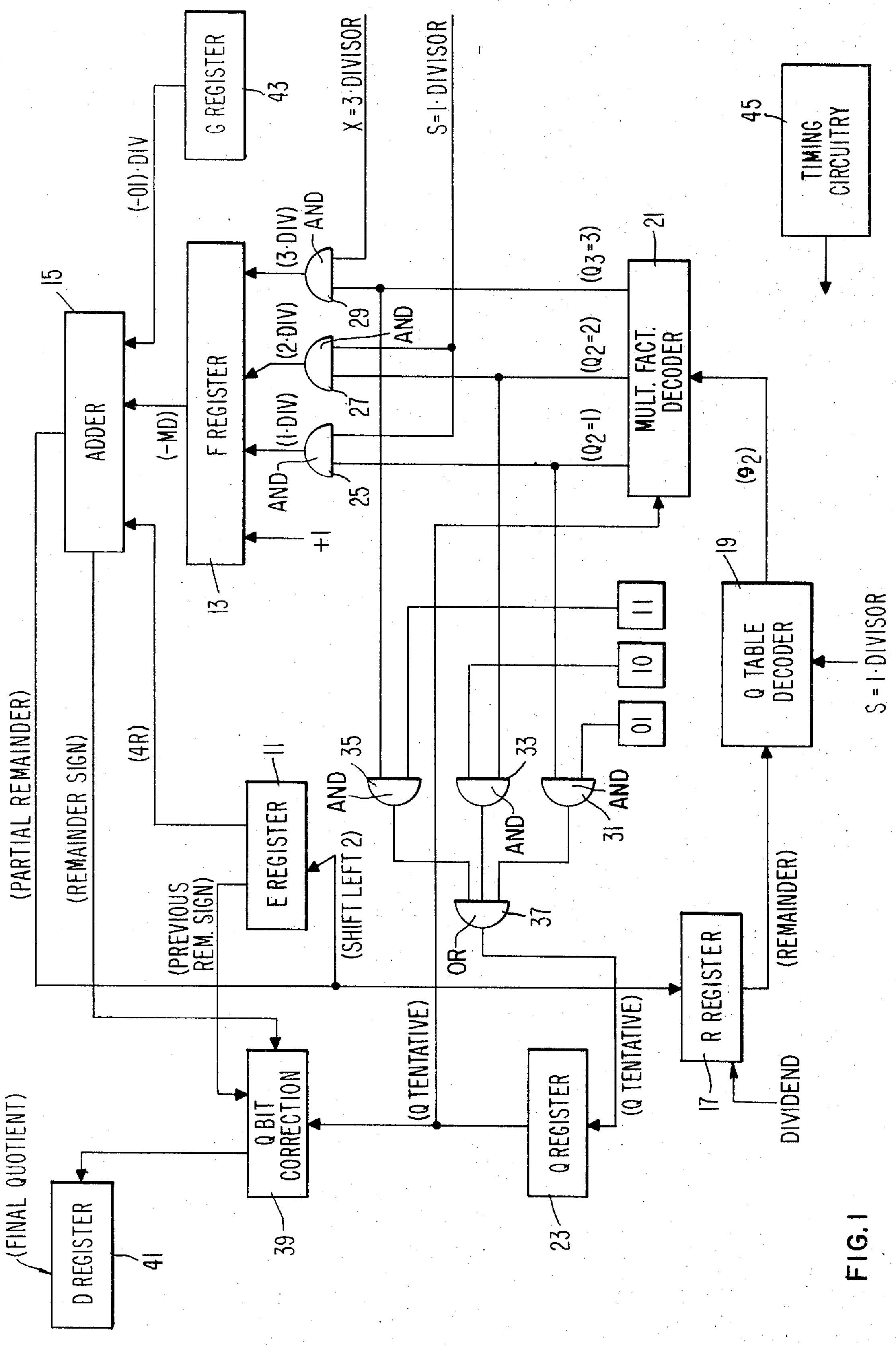
FIG. 1 is a block diagram of the functionally operating parts of the divider.

A preferred, but by no means only implementation of this invention may be represented by a functional block diagram as shown in FIG. 1 and may include an E register 11 and an F register 13 for holding addends for loading into an adder 15. As a result of the addition in adder 15 a partial remainder is loaded into an R register 17 and is also entered into E register 11 having been shifted left two-bits before entering the E register 11. The addend entered into the adder 15 from register 11 as a result of the shift left two is therefore four times the partial remainder produced by adder 15. As can be seen in FIG. 1, a plus one (+1) is also entered into F register 13 to produce the negative (in one's compliment) of the addend held. The addend entered into adder 15 from F register 17 is therefore the negative of the value entered into the register 17. A G register 43 holds a value of $-1x$ divisor which is entered into the adder 15 on the initial adder cycle.

The partial remainder as stored in R register 17 is fed to a decoder 19 along with the value of the divisor. As with most iterative division devices the dividend is entered into the partial remainder register, herein R register, for the initial cycle operation. Decoder 19 is a table driven decoder, the operation of which is defined below in the discussion of the Q table. The Q table decoder 19 output is loaded into multiplication factor decoder 21. Operation and description of this decoder 21 is discussed below. A "Q" register 23 holds tentative quotient bits developed. The output of this "Q" register 23 is fed back as an input to multiplication factor decoder 21.

The operation of the decoder 21 produces an enable signal on one of three decoder 21 output lines which are each respectively tied to an input of one set of and-gates 25, 27 and 29 to pass "1," "2" or 3 times the divisor respectively to the inputs of F register 13. The other inputs of gates 25 and 29 are tied to a "1" Divisor signal and "3" Divisor signal respectively. A "1" Divisor signal is tied to the other inputs of gate 27 and a "2" factor is accomplished by a bit shift to the left from the output of gate 27 to the input of F register 13. The outputs of gates 25, 27 and 29 are connected in parallel to the inputs of F register 13.

In addition to being connected one each to gates 25, 27 and, 29 the output lines from decoder 21 are also connected one each to sets of and-gates 31, 33 and 35, with the "1," "2" and "3" factor output lines of decoder 21 enabling gates 31, 33 and 35 respectively. The other inputs of these gates 31, 33 and 35 are tied respectively to the possible quotient bit values of 01, 10 and 11 to be entered into O register 23 as the tentative quotient bits. The outputs from gates 31, 33 and 35 are "or'd" through gates 37 to feed Q register 23.

Besides being fed back to input multiplication factor decoder 21, the output from register 23 is connected to Q bit correction decoder 39. Q bit correction decoder 39 also receives the previous remainder sign as input from the E register 11 and the present remainder sign as input from the adder 15 to correct the 2 quotient bits and load them into a D register 41 which holds the entire quotient answer.

Timing circuitry 45 generates timing pulses needed for the operation of the invention. These pulses clock the operation of the various components so as to effect a sequence of parallel operations between multiplication factor development and partial remainder development as will be discussed below with respect to a timing diagram. The 2 bit division method as performed by the invention preferably requires a multiple of the divisor to be subtracted from four times the remainder, (4R − MD), in an adder circuit for a remainder (R) greater than or equal to zero and a four times the remainder to be added to a multiple of the divisor (4R + MD) when the remainder R is less than zero. This may occur after the divisor and the remainder (dividend) have been normalized in the usual manner, i.e., by shifting each value the same number of digits to the left in a recirculating register to get one in the most significant digit and also by assuring that as a result the divisor becomes larger than the dividend. The factor of four has been used in the subtraction equation for the remainder and implicitly for the divisor so that fewer digits need be carried into the adder to define these values.

Two quotient bits which compose the multiplication factor M reflect a multiple of the divisor to be subtracted from 4R. This multiple can either be 00, 01, 10 or 11. The exact multiple of the divisor that should be chosen can be determined by examining the relative magnitudes of the remainder (R) and the divisor (D). Through the use of a table and a decoder the multiple of D can be selected. Since this selection could take up to a full adder cycle and it is desired by this invention that the 2-bit generation cycle time be shortened to approach, if not equal 9 full adder cycle time the classic 2-bit, non-restore processes must be altered, staggered and overlapped so that the divisor multiplication factor bits required for the next adder cycle are derived in parallel with the present (4R − MD) adder cycle. If divisor multiple (M) selection was not initiated until the result of the present (4R − MD) adder cycle could be examined in the accumulator register, it would require two adder cycle times to generate 2 Q bits and there would be no resultant descrease in overall divide time. This is not the case with the present invention.

Since the new remainder being developed during the present (4R − MD) adder cycle will not be available for examination by the table and decoder until the end of the adder cycle, the next 2 quotient bits (divisor multiple) must be predicted using present information. This information would be the multiple of the divisor presently being subtracted from four times the remainder and the decoder output during the present adder cycle.

Under the method presented herein, the prediction of the next 2 quotient bits generated will be either correct or one greater than the correct multiple of the divisor. If the divisor selection for a particular (4R − MD) adder cycle is correct, the 2 quotient bits generated can be loaded into the quotient register unchanged. If the divisor multiple selection was one greater than correct, the 2 quotient bits generated must be modified before entering them into the quotient register, and the selection of the 2 quotient bits for the next adder cycle must be such as to compensate for the present miscalculation.

Quotient Table Organization

To determine the multiple of the divisor (D) to be subtracted from 4R (b 4R + MD when R < 0), a quotient table is implemented by Q table decoder 19 and selection logic to examine the 6 most significant bits of R and 5 most significant bits of D to produce the multiple. This table may be represented graphically by FIG. 2 and provides four bit quotient values of a normalized divisor and the 39 values of the remainder.

Figure 2:
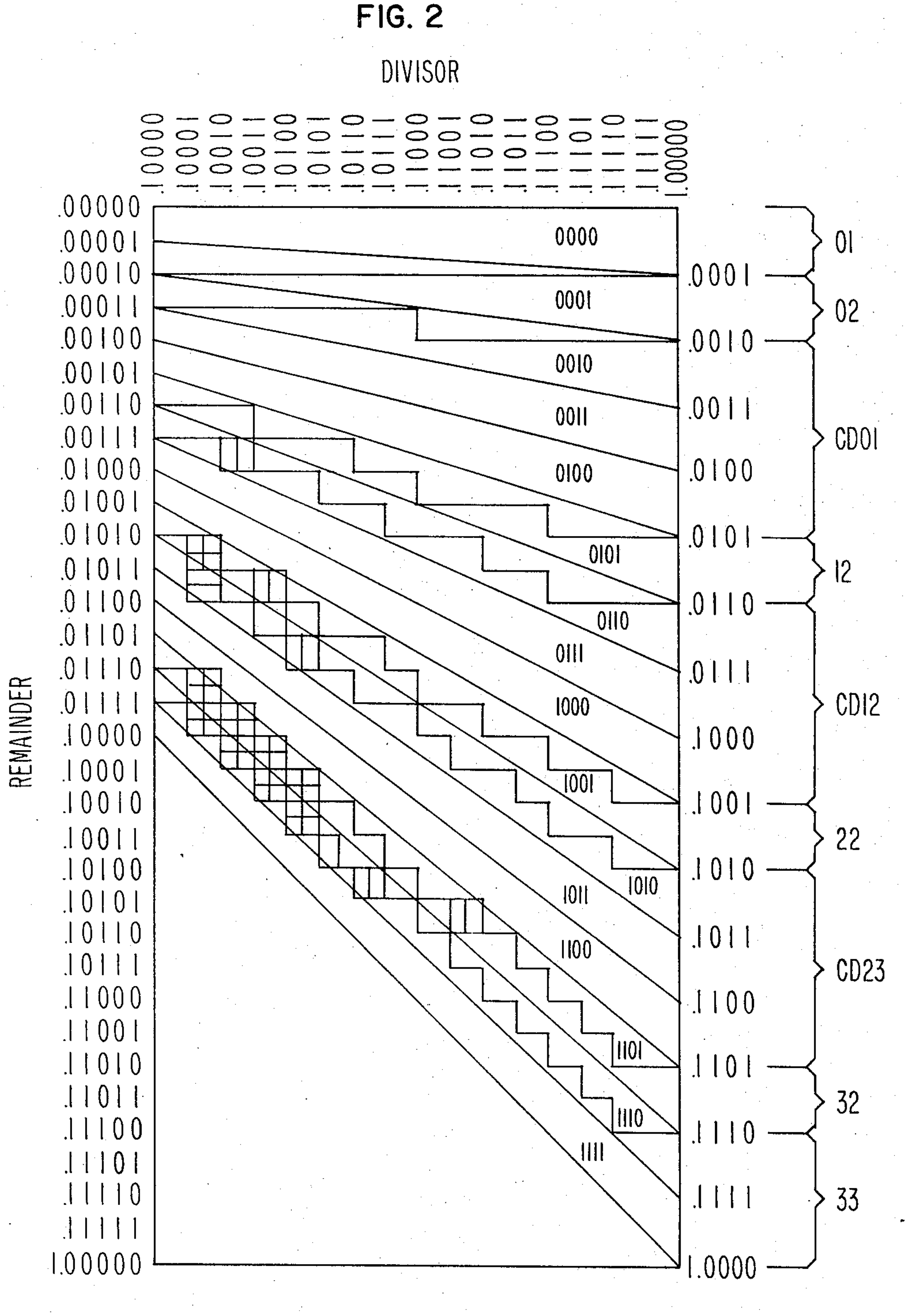
FIG. 2 shows the "truth table" which graphically represents quotient bit generation from divisor and remainder values.

Referring to FIG. 2; since the divisor will be normalized for the entire process, the five bit values of D range from 0.10000 (½) to 0.11111 (31/32). Once the division process has begun, the remainder may or may not be normalized, therefore 39 values of R ranging from 0.00000 to 0.11111 (31/32) must be examined. Quotient values, derived by the division of the divisor into the remainder, can range from 0.0000 to 0.1111 (15/16). After the first subtraction of a divisor multiple from the dividend, the remainder cannot be larger than the divisor, therefore quotients of greater than 1 cannot exist.

Diagonal lines on this FIG. 2 representing each of the possible quotients are drawn from the upper left corner of the square intersected by the minimum values of R and D which produce a given quotient, to the lower right corner of the square intersected by the maximum value of R and D yielding the same quotient.

Example: Quotient 0.1000(½)

This quotient line is drawn from the upper left corner of the square intersected by D = 0.10000 (16/32) and R = 0.01000 (8/32) to the lower right corner of the square intersected by D = 0.11111 (31/32) and R = 0.01111 (15/32).

Any point along a given quotient line represents the values of R and D that will produce that particular 4 most-significant bits of quotient. Within the area of any square can be found all of the full 39 bit quotients derived by the full 39 bit values of R and D.

The full quotients within the squares that are intersected by one quotient line are divided into two groups. The area above the quotient line contains those full quotients that are less than the value of the quotient line. The area below the quotient line contains those full quotients that are greater than the quotient line. These squares contain full quotients whose values can fall into either of two, four-bit quotient groups. By decoding these squares to be in the higher quotient group, all quotients approximated by examining the designated most significant bits of R and D can be considered to be either correct or one greater than correct when only for bits of predicted quotients are looked at.

Full quotients within the squares intersected by two quotient lines could fall into either of three, four-bit quotient groups. If these squares were decoded to be in the highest quotient group, some of the quotients approximated by examining only 5 bits of R and D would actually be two greater than correct. Since this system allows for a quotient choice to be no more than one greater then correct, it will be necessary to examine only the 6 most significant bits of R and D to resolve these squares so that they will encompass only two quotient areas.

The full quotients contained within squares that are maintained entirely within one quotient area can be decoded for that quotient group and will always be correct.

Q-Bit Selection

The 4 quotient bits representing a quotient area will be designated as follows:

$$\underbrace{.x\ x}_{q_1}\ \underbrace{x\ x}_{q_2}$$

These quotient bits ($q_1$, $q_2$) reflect the factor of the divisor which must be subtracted from 4R. The 2 most significant bits of the quotient ($q_1$) represent the multiple of D to be subtracted from 4R during the first (present) adder cycle. The 2 least significant bits ($q_2$) represent the multiple of D to be subtracted during the next adder cycle.

Example: R = 1.00110, D = 0.10000, $$Q = \underbrace{.01}_{q_1}\ \underbrace{10}_{q_2}$$

First Adder Cycle 0.11000 $4R_{p-1}$
(4R − 1D) −0.10000 1D/0.01000 $R_p$
Second Adder Cycle 1.00000 $4R_p$
($4R_p$ − 2D) 1.00000 2D/0.00000 $R_{p+1}$ Although $q_1$ selects the multiple of D to be subtracted from 4R, it is possible for $q_1$ to be greater by one than the correct value. This requires an adjustment of $q_1$ before entering these 2 bits into the quotient register. The actual value of $q_1$ placed into the quotient register depends upon the sign of 4R at the beginning of an adder cycle and whether a sign change is taking place as a result of this present adder (4R − MD) cycle.

To assure the proper adjustment of the 2 Q bits being entered into the quotient register, and the correct selection for the next multiple of D, three distinct remainder and adder cycles must be examined:

The remainder of the present adder cycle $_p$ which is designated $R_p$,

The remainder of the last adder cycle $_{p-1}$ which is designated $R_{p-1}$, and The remainder of the next adder cycle $_{p+1}$ which is designated $R_{p+1}$.

FIG. 3 is a truth table for the comparison of the signs of $R_{p-1}$ and $R_p$ and shows the Q bits selected for entering into the quotient register. This table is mechanized by Q-bit correction decoder 39 (FIG. 1). From FIG. 3 it can be seem that if the last remainder was positive ($R_{p-1} > 0$) and the remainder beind produced by the present adder cycle *P* is going to be positive ($R_p = 4R_{p-1} - q_1 D > 0$), then the tentative Q bits generated by the decoder 39 were correct and the Q bits entered into the quotient register are $Q_T$, where $Q_T = M$. (The definition of M will be discussed later in the discussion of FIG. 4.)

FIG. 4 shows the multiplication factor (M) obtained from multiplication factor decoder 21 (FIG. 1) as some function of quotient bits $q_2$ and the sign change between two successive remainders. Referring to FIG. 4: the multiple of D, in this case, that will be subtracted from $4R_p$ during the next adder cycle $_{p+1}$ will be $M' = q_2$ where $q_2$ is generated from the "Q"table decoder 19.

$$\text{i.e., } R_{p+1} = 4R_p - g_2 D$$

If the last remainder was positive ($R_{p-1} > 0$) and the present remainder is going negative ($4R_{p-1} - MD < 0$), then the tentative Q bits ($Q_T$) generated from the quotient table of FIG. 2 by decoder 19 and decoder 21 (FIG. 1) are 1 greater than correct. For this case, as shown by FIG. 3, the Q bits entered into the quotient register 41 (FIG. 1) will be $Q_T-1$.

The multiple of D that will be added to $4R_p$ during the next adder cycle $_{p+1}$ will be $4-q_2$ as seen from FIG. 3. Mathematically this can be shown as:

$$4(R_p + D) - q_2 D = 4R_p + MD$$

$$(4-q_2)D = MD$$

$$4-q_2 = M$$

Therefore in the next adder cycle $_{p+1}$:

$$R_{p+1} = 4R_p + (4-q_2)D$$

If the last remainder was negative ($R_{p-1} < 0$, and the present remainder is going positive ($4R_{p-1} + MD > 0$), then the Q bits selected were 1 greater than the Q bits entered into the quotient register 41 (FIG. 1). As seen from FIG. 3, in this case the quotient bits entered into the quotient register 41 (FIG. 1) will be $4-Q_T$, where $Q_T = M$ as determined by FIG. 4 in the previous cycle. Mathematically this can be shown as:

$$4(R_{p-1} + D) - Q{\cdot}D = 4R_{p-1} + Q_T D$$

$$(4-Q)\ D = Q_T{\cdot}D$$

$$Q = 4 - Q_T$$

The multiple of the divisor to be subtracted from $4R_p$ during the next adder cycle $_{p+1}$ will be $4-q_2$, as taken from FIG. 4, and which may also be shown mathematically as:

$$4(R_p - D) + q_2 D = 4R_p - M{\cdot}D$$

$$-(4 - q_2)\ D = 1\ M{\cdot}D$$

$$4 - q_2 = M$$

If the last remainder was negative ($R_{p-1} < 0$) and the present remainder is going to be negative ($4R_{p-1} + MD < 0$) then the Q bits were correct, and as shown from FIG. 3 the Q bits entered into the quotient register 41 (FIG. 1) will be $3-Q_T$, where $Q_T = M$. Mathematically this can be shown:

$$4(R_{p-1} + D) - Q{\cdot}D = (4R_{p-1} + Q_T D) + D$$

$$(4-Q){\cdot}D = (Q_T + 1){\cdot}D$$

$$Q = 3-Q_T$$

The next multiple of the divisor to be added to $4R_p$ for the next adder cycle $_{p+1}$ will be $q_2$, see FIG. 4. Therefore in the next adder cycle $_{p+1}$:

$$R_{p+1} = 4R_p + q_2 D$$

From these four possible cases it can be concluded that the multiple of the divisor that will be presented to the adder 15 (FIG. 1) during the next cycle $_{p+1}$ will be the FIG. 2 value for $q_2$ if the present adder cycle $_p$ does not cause a sign change. If adder cycle $_p$ does cause a sign change, the multiple of D for adder cycle $_{p+1}$ will be $4 - q_2$.

Decoder Organization

Rather than decoding the combinations of R and D in the Q table decoder 19 for each of the 16 different quotient values as shown in FIG. 2, the decoder was organized as follows:

Generally, the squares that were contained entirely in one quotient area were decoded for that area. Squares that spanned two quotient areas were decoded for the higher quotient area. Since this system allows for decoding a particular quotient as being one greater than correct, it is unnecessary to decode for selecting 0 as a multiple of the divisor. Therefore, squares contained in the 0000 quotient area of Table I or both the 0000 and 0001 areas of FIG. 2 were decoded as 0001 or "01." Referring to FIG. 2, squares contained in the 1111 quotient area or both the 1111 and 1110 areas were decoded as 1111 or "33." Squares contained in quotient areas XX10 or both XX10 and XX01 are included in groups "02, 12, 22, 32." Since only the five most significant bits of R and D are examined by the decoder 19, the correct quotient for squares intersected by a quotient line cannot be determined without using an adder cycle. This fact becomes significant for quotient lines 0100, 1000, and 1100. These lines separate quotient areas whose two most significant bits ($q_1$) differ by one, meaning that FIG. 2 alone cannot determine which of the two possible divisor multiples is actually being presented to the adder during the present cycle $_p$. Since the decoder 19 cannot distinguish between these adjacent quotient areas they are decoded togethr and additional information is examined to determine the proper divisor multiple for the next adder cycle $_{p+1}$. Since a zero times multiplication factor is never used as a multiple of D, the quotient areas of 0101, 1001, and 1101 can be included in the combination decodes with 0100, 1000, and 1100 respectively.

The combination decodes are defined as follows:

CD01 = 0011 (03), 0100 (20), 0101 (21) — indicates that either one or two times (one greater) the divisor is presently in the adder.

CD12 = 0111 (13), 1000 (20), 1001 (21) — indicates that either one, two or three times (one greater) the divisor is presently in the adder.

CD23 = 1011 (23), 1100 (30), 1101 (31) — indicates that either two or three times the divisor is presently in the adder.

Divisor Multiple Selection

The selection of the divisor multiple (1, 2, 3) for adder cycle $_{p+1}$ will be developed during adder cycle $_p$ by the multiplication factor decoder 21 (FIG. 1) and will be determined by two factors:

1. The divisor multiple actually selected for adder cycle $_p$ during adder cycle $_{p-1}$.
2. The decoder 19, (FIG. 1), output during adder cycle $_p$.

The following is an explanation of the equations for selecting a multiplication factor of 1, 2 or 3 for the divisor during adder cycle $_p$ to be used in adder cycle $_{p+1}$. It is assumed that the division is in progress, e.g., the present adder cycle $_p$ is not the first adder cycle. Special logic is required to initiate the division process in selecting the first multiple of D to be subtracted from four times the remainder (4R).

To Select a Multiplication Factor of 1

Select 1X = CD01·Last Time 1 + CD12·Last Time 2 + CD23·Last Time 3

Wherein each term is arrived at as follows:

CD01·Last Time 1

During adder cycle $_p$, the decoder 21 examines D and $R_{p-1}$ and determines the four bit quotient ($q_1 . q_2$) to be either (0,1), (1,0) or (1,1). This indicates that the multiple of the divisor presently in the adder is 1. However, the actual selection of the divisor multiple for adder cycle $_p$ was made before remainder $R_{p-1}$ could be examined in the accumulator register by the decoder, meaning that possibly a factor of 1 or 2 (1 greater) is actually being presented to the adder. This necessitates the retaining of what multiple was actually selected last time, or during adder cycle $_{p-1}$. If Last Time 1 was selected for adder cycle $_p$ and there is no sign change occurring, then 1 was correct and $q_2$ will determine the selection for adder cycle $_{p+1}$. Since $q_2$ can only be either a zero or a one, 1 will be selected. If adder cycle $_p$ is producing a sign change, then the selection of 1 was one greater than correct. This indicates that the correct quotient actually lies in the (0,3) quotient area of CD01. The multiple of D that should be selected for the next adder cycle $_{p+1}$ will be $4-q_2 = 4-3$ or one times. In effect, the sign change factor cancelled out since 1 is always selected when CD01·Last Time 1 exists.

CD12·Last Time 2

CD12 (1,3), (2,0), (2,1) indicates that the multiple of D presently in the adder is either 1, 2 or 3 (1 greater). Last Time 2 indicates that two times factor was actually selected. If 2 is correct (same sign) then $Q_2$ (0 or 1) will determine the one times factor selection. If 2 was 1 greater then correct (sign change), then quotient area (1,3) is implied and the multiple of D for adder cycle $_{p+1}$ will be $4-q_2 = 4-3$ or still one times.

CD12.Last Time 3

CD23 (2,3), (3,0), (3,1) indicates the multiple of D presently in the adder is either 2 or 3. Last Time 3 was actually selected and if correct (same sign) then $q_2$ (0 or 1) determines the one times selection. If 3 was one greater than correct (sign change) then quotient area (2,3) is indicated as correct. The multiple of D selected for adder cycle $_{p+1}$ will be $4-q_2 = 4-3$ or one times factor.

The Equation For Selecting A Factor Of 3

Select 3X = 01 + 33 + CD01·Last Time 2 + CD 12 (Last time 1 + Last Time 3) + CD23·Last Time 2

Wherein the terms not previously defined are:

01

Decode 01 indicates that zero times the divisor should be presently in the adder. Since 0 is never selected, 1 must have been and is one greater than correct (sign change). This means the multiple of D for adder cycle $_{p+1}$ will be $4-q_2 = 4-1$ or three times factor.

33

Since 4D is not available, decode 33 indicates that 3D is presently in the adder and is correct. Therefore the D selection for adder cycle $p_{+1}$ will be $q_2$ or three times factor.

CD01·Last Time 2:

CD01 (0,3), (1,0), (1,1) indicates that either 1 or 2 D is presently in the adder. Last Time 2 indicates that 2 (1 greater) was actually selected and will cause a sign change. This implies that 1,0 or 1,1 had to be correct, therefore, the multiple of D selected for adder cycle $_{p+1}$ will be $4q_2 = 4-1$ or three times factor.

CD12·Last Time 1

CD12 (1,3), (2,0), (2,1) indicates that either 1, 2 or 3 (1 greater) is presently in the adder. Since Last Time 1 was selected it must have been correct because a multiple of D one less than correct cannot be selected in this system. Therefore the multiple of D selected for adder cycle $_{p+1}$ will be $q_2$ or a multiplication factor of 3.

CD12·Last Time 3

These conditions indicate that three times factor was one greater and a sign change will occur during adder cycle $_p$. This implies that either 2,0 or 2,1 is correct, therefore the multiple of D selected for adder cycle $_{p+1}$ will be $4-q_2 = 4-1$ or three times factor.

CD23·Last Time 2

CD23 (2,3), (3,0), (3,1) indicates that either two or three times is presently in the adder. Since Last Time 2 was selected it must be correct (never 1 less), therefore the multiple of D selected for adder cycle $_{p+1}$ will be $q_2$ or three times factor. To select a multiplication factor of 2:

Select 2X = 01 + 12 + 22 + 32

When either one or three times the divisor is being selected, two times D will be chosen.

$$2X = \overline{1X} \cdot \overline{3X}$$

First Cycle Divisor Selection

FIG. 2 and decoder 19 (FIG. 1) cannot be used for selecting the divisor multiple for the first adder cycle because they evaluate the present adder cycle along with what was selected last time. To start the division process, a divisor multiple must be chosen and the first adder cycle initiated. During the first adder cycle, FIG. 2 mechanized by decoder 19, (FIG. 1) can provide the divisor selection for the second and remaining cycles.

This initial divisor multiple will be chosen by examining the relative magnitudes of the normalized numerator and divisor, and the difference in length between the two. The difference in length between the numerator and divisor becomes of special concern when that difference is ODD, since 2 quotient bits are generated every adder cycle.

For $N_{Length} - D_{Length} = \text{EVEN}$:

Since both N and D are normalized, the quotients range between:

0.1111 . . . 1/0.10000 . . . 0 = 2 Maximum 0.10000 . . . 0/0.1111 . . . 1 = ½ Minimum By shifting the numerator 2 places right, the quotients would then range between:

0.00111 . . . 1/0.10000 . . . 0 = ½ Maximum 0.00100 . . .0/0.11111. . .1= ⅛ Minimum Since after shifting, the quotients vary between 0.0010 (⅛) and 0.1000 (½), one times the divisor is acceptable for the first adder cycle.

For $N_{Length} - D_{Length}$ = ODD

To eliminate the problem of generating an odd number of quotient bits, the normalized numerator will be shifted one place right, affecting an EVEN difference between the lengths. By shifting the numerator one place right, the quotients would then range between:

0.01111 . . .1/0.1000 . . . 0 = 1 Maximum 0.01000 . . .0/0.11111 . . .1 = ¼ Minimum The range of these quotients would require selection of either one, two or three times the divisor. Since it is acceptable to multiply D by 2 (a multiplication factor of 1) the numerator and divisor are examined to select two or three times D:

Select 2X 0.010 . . ./0.1 . . . =

0.01011 . . . 1/0.11000 . . . 0 = ¾ Maximum 0.01000 . . . 0/0.11111 0.11111 . . . 1 = ¼ Minimum Select 2X 0.010 . . ./ 0.11 . . . =

0.01111 . . . 1/ 0.11000 . . . 0 = ⅔ Maximum 0.01000 . . . 0/ 0.11111 . . . 1 = ¼ Minimum Select 3X 0.011 . . . / 0.10 . . . =

0.01111 . . . 1/ 0.10000 . . . 0 = 1 Maximum 0.01100 . . . 0/ 0.10111 . . . 1 = ½ Minimum In summary, first cycle selection when the length difference between the numerator and divisor is EVEN will always be a divisor multiplication factor of 1.

First cycle selection for an ODD length difference is:

2X = 0.010 . . ./ 0.1 . . . or 0.01 . . ./0.11 . . .

3X = 0.011 . . ./ 0.10 . . .

FIGS. 6 and 6*a* shows the results of the machine operation in the Q table decoder 19 (FIG. 1), the decoder 21, (FIG. 1) for multiplication factor selection, the adder 15 and the Q bit correction 39 and quotient "D" register 41 (FIG. 1) for the division of 3,115 by 7 to obtain a quotient of 445 (3115/7 = 445) as performed in binary by this invention. Column 1 lists the adder cycles. Column 2 shows the Q table decoder 19 output for each cycle. Column 3 shows the selected (corrected) multiplication factor (M) for the dividend in each cycle. Column 4 shows the actual adder entries for four times the remainder and M times the divisor in the adder and the actual adder operation (4R − MD) as performed in the adder in each cycle. Also included in column 4 is the sign changes between previous and succeeding remainder. Column 5 shows the quotient register after the corrected quotient bits are entered at the end of each adder cycle. Also shown in column 5 is the correction factor used for correcting the temporary quotient bits.

FIGS. 7 and 7*a* shows the operation of the invention as was shown in FIGS. 6 and 6*a* but for the division of 2925/13 = 225.

Figure 5:
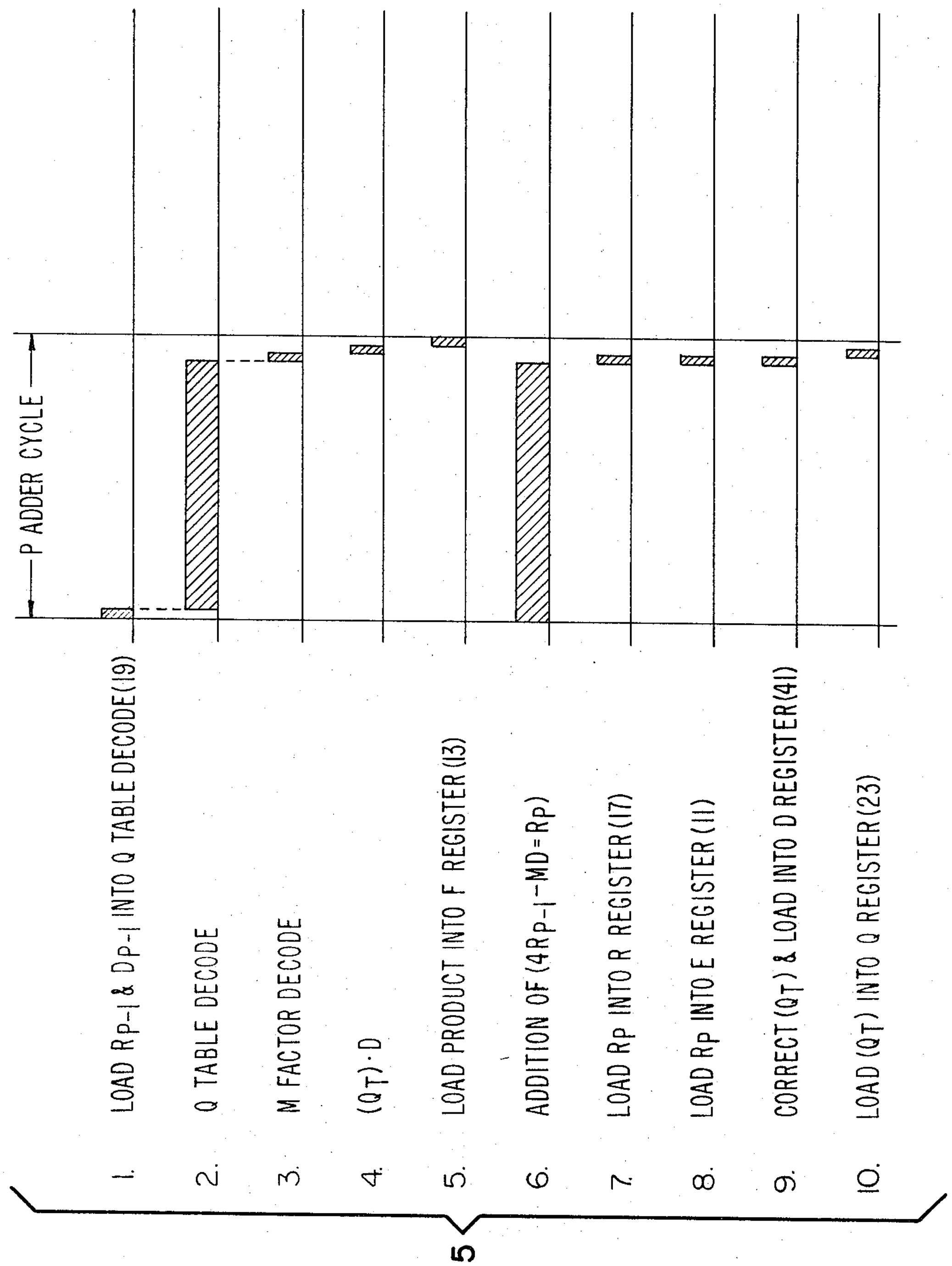
FIG. 5 shows the timing diagram of divider operations.

The sequence of operations of the invention as shown in FIG. 1, the circuit block diagram, can be easily understood from the timing diagram of FIG. 5. Component operation is initiated by timing pulses generated by timing circuitry 45 (FIG. 1) or by operation or completion of operation of other circuit components.

At the beginning of each adder cycle ($_p{}^{th}$ cycle), except the very first cycle, the divisor and the partial remainder as stored in R register 17 which was obtained as a result of the subtraction performed in the adder in the previous cycle are entered (Line 1) into the Q table decoder 19. Once these values have been entered decoding is conducted (Line 2) to produce $(q_2)_p$ the provisional multiplication factor which is immediately decoded (Line 3) in multiplication factor decoder 21 to produce multiplication factor M which is also $Q_T$ the temporary quotient ($M = Q_T$). The proper product 1D, 2D, or 3D is obtained (Line 4) by enabling gate 25 or 27 or 29 and the product is entered (Line 5) into the F register 13 which completes the cycle.

While this was occurring the rest of the apparatus takes the information generated by the above described apparatus in the previous cycle ($_{p+1}$) to generate two quotient bits.

The adder adds the values (Line 6) of four times the remainder and minus (M) times the divisor (4R − MD) as held by E register 11 and F register 13, respectively. Once this is accomplished the partial remainder produced is loaded into R register 17 (Line 7) and is loaded into E register 11 (Line 8) after being shifted two bits to the left which accomplishes a multiplication of four (which permits 4R to be ready for the next cycle). At the same time the temporary quotient stored in Q register 23 is corrected in Q bit correction decoder 39 using the historical remainder sign information previously discussed. Finally, (Line 10) the correct 2 bits of quotient are entered into the quotient "D" register 4.

It is intended that all matter contained in the above description or shown in the accompanying drawings shall be interpreted as illustrative and not to be taken in a limiting sense. Moreover, there can be a number of different mechanizations for each of the various components of the invention as shown in FIG. 1 some of which are quite straightforward. The inventors use these components as the building blocks of their invention. A component which is more involved to mechanize is Q table decoder 19 (FIG. 1). This decoder may be constructed by one skilled in the art from the description above and from FIG. 2. FIG. 2 acts as an interpolation table in the divisional process of the invention and becomes the truth table by which one skilled in the art can easily build the actual decoder.

What is claimed:

1. A 2-bit, non-restore, look-ahead, binary divider, comprising:

means for subtracting a multiple of the divisor from four times the remainder for providing a new remainder in each cycle of operation;

means for developing a tentative divisor multiplication factor in each cycle of operation and concurrently with the operation of said subtracting means, said developing means being tied to said subtracting means;

means for correcting said tentative factor developed, concurrently with the operation of said subtracting means, said factor correcting means being connected to said tentative factor developing means;

means for generating tentative bits of quotient in each cycle of operation, being connected to said factor correcting means; and means for correcting said tentative quotient bits generated in each operating cycle to corrected quotient bits, said quotient bit correcting means being connected with said tentative quotient bit generating means and said subtracting means.

2. Apparatus of claim 1 wherein said subtracting means includes:

adder means for adding two values for providing a partial remainder and sign;

first storage means including shift means for storing four times the partial remainder provided by said adder means, said first storage and shift means having its input tied to the remainder output of said adder means and its output tied to an input of said adder means;

second storage means for providing a negative one times the divisor to said adder means at the initiation of the division operation, being connected to an input of said adder means; and third storage means including gating and sign changing means for providing a multiple of the divisor to said adder means said third means being connected on its input to said factor correcting means and on its output to an input to said adder means.

3. Apparatus for claim 1 wherein said developing means includes:

means for temporarily holding partial remainder values said means being fed from said subtracting means; and decoder means for decoding partial remainder and divisor values for developing said tentative divisor multiplication factors, said decoder being connected to said temporary holding means.

4. Apparatus of claim 3, wherein said tentative quotient bit generating means includes:

means for selectively choosing among predetermined bit values, said means being controlled by the output of said tentative factor correcting means; and means for storing said bit values selected, said storage means being connected to said selection means.

5. A 2 bit, non-restore, look-ahead binary divider comprising:

a full propagate adder;

a first register having an input connected to shift-left 2 bits a value entered from an output of said adder, said register input being connected to said adder output, said register output being connected to an input of said adder;

a second register having its output tied to one of said adder inputs, said second register containing the divisor value;

a third register having its output tied to an input of said adder;

a first selection circuit having its output connected to the input of said third register, said first selection circuitry being input by one times the divisor and three times the divisor signals;

a first decoder circuit, said decoder having its output connected to the input of said first selection circuitry;

a second decoder circuit, said second decoder having its output connected to the input of said first decoder and being input by a divisor value;

a fourth register having its output connected to said second decoder circuit and its input connected to said adder remainder output;

a second selection circuit being tied on its inputs to said first decoder circuit;

a fifth register being connected on its input to the output of said second selection circuit and on its output to an input of said first decoder circuit; and a third decoder circuit having an input each from the output of said fifth register, from an output of said first register and from an output of said adder.

6. An iterative method of 2 bit, non-restore, look-ahead, binary division in a digital processor, incorporating the subtraction of a multiple of the divisor from four times the remainder wherein the dividend is the remainder for the initial iteration, comprising the steps of:

examining with first decoding means the magnitudes of the divisor and the remainder from the preceding iteration to predict a tentative multiplication factor;

adjusting with second decoding means said tentative multiplication factor based on feed back from the preceding iteration to produce a corrected multiplication factor;

selecting with first selecting means a divisor multiple based upon the corrected multiplication factor produced;

storing with storing means four times the remainder generated in the preceding operation;

performing with adder means said subtraction;

selecting with second selection means a tentative quotient based upon the corrected multiplication factor produced;

correcting with third decoding means the tentative quotient bits based on the history of the sign change between the present and previous remainders; and entering with loading means said corrected quotient bits into a quotient register.

* * * * *

UNITED STATES PATENT OFFICE
CERTIFICATE OF CORRECTION

PATENT NO. : 3,852,581

DATED : Dec. 3, 1974

INVENTOR(S) : Fred T. Reynard et al

It is certified that error appears in the above-identified patent and that said Letters Patent are hereby corrected as shown below:

Col. 4, line 12 "O" should read --Q--; Col. 4, line 57, "9" should read --a--. Col. 5, line 24 delete the "b" in the equation (b 4R + MD when R 0). Col. 6, line 37, in the Example delete R=1.00110 and insert --R=00110--. Col. 7, line 1, "seem" should read --seen--; line 2, "beind" should read --being--; line 3, "P" should read --p--; line 19, "$R_{p+1} = 4Rp - g_2D$" should read --$R_{p+1} = 4Rp - q_2D$--. Col. 8, line 29 "Table I" should read --Fig. 2--; line 48, "togethr" should read --together--. Col 10, line 64, "0.1111..." should read --0.11111.....--; line 65, "0.1111..." should read --0.11111.....--. Col. 11, line 14, "0.1000..." should read --0.10000.....--; line 24, "0.11000..." should read --0.10000.....--; line 25, delete "0.11111" (second occurrence). Col. 12, line 23, "$_{(p+1)}$" should read --$_{(p-1)}$--.

Signed and Sealed this

*twenty-ninth* Day of *July 1975*

[SEAL]

*Attest:*

RUTH C. MASON
*Attesting Officer*

C. MARSHALL DANN
*Commissioner of Patents and Trademarks*